United States Patent [19]
Farr

[11] 3,918,768
[45] Nov. 11, 1975

[54] HYDRAULIC BRAKING SYSTEMS

[75] Inventor: Glyn Phillip Reginald Farr, Warwick, England

[73] Assignee: Girling Limited, Birmingham, England

[22] Filed: June 17, 1974

[21] Appl. No.: 480,103

[30] Foreign Application Priority Data
June 16, 1973 United Kingdom............ 28722/73

[52] U.S. Cl......... 303/21 F; 188/181 A; 303/21 AF
[51] Int. Cl.² .......................................... B60T 8/02
[58] Field of Search... 188/181 A; 303/21 AF, 21 F, 303/21 C, 21 CE, 21 CF, 21 CG, 50

[56] References Cited
UNITED STATES PATENTS

| | | | |
|---|---|---|---|
| 2,868,338 | 1/1959 | Lucien et al.................... | 188/181 A |
| 2,963,328 | 12/1960 | Lucien......................... | 188/181 A X |
| 3,666,328 | 5/1972 | Williams...................... | 188/181 A X |

*Primary Examiner*—Duane A. Reger
*Attorney, Agent, or Firm*—Scrivener, Parker, Scrivener and Clarke

[57] ABSTRACT

A vehicle hydraulic braking system incorporates a power valve assembly and means for relieving pressure in the event of a skid. A piston is advanced on application of the brake pedal to open a first valve controlling a connection to a fluid pressure source and to close a second valve controlling a connection to a reservoir. The piston can be retracted by supply of pressure fluid to the assembly in the event of a skid.

12 Claims, 6 Drawing Figures

HYDRAULIC BRAKING SYSTEMS

This invention relates to an hydraulic braking system for vehicles of the kind incorporating a power valve assembly and means for relieving the braking pressure in the event of a skid.

According to the invention in a braking system of the kind set forth a piston working in a cylinder of the power valve assembly is adapted upon axial movement in response to actuation of a brake pedal to open a normally closed first valve of the assembly and to close a normally open second valve of the assembly, said first valve controlling a connection to a fluid pressure source, and said second valve controlling a connection to a reservoir, a pressure space being defined between said piston and said cylinder, and the system being so arranged that in the event of a skid the pressure space is supplied with pressure fluid to retract said piston to close said first valve and open said second valve to relieve the braking pressure.

Thus the power valve assembly also acts to relieve the braking pressure to reservoir so a separate dump valve is not required.

The power valve assembly may be incorporated in a power booster for an hydrostatic master cylinder or preferably, the first and second valves control direct connections to the brakes.

Conveniently said fluid pressure source also supplies pressure fluid for retracting the piston.

The supply of a pressure fluid for retracting said piston may be controlled by an electrically operated control valve responsive to an electrical skid signal, but it may be controlled in other ways, by means of a load conscious valve for example.

Preferably the power valve assembly comprises a stepped piston which works in a stepped bore in a housing and which operates the first and second valves, and a chamber formed between the step in the piston and the step in the bore is connected to the control valve.

The piston may be pedal operated or operated by fluid pressure from a master cylinder. In the latter case the power valve assembly may be located remote from the master cylinder at any convenient position in the vehicle.

The braking system may be a dual circuit system including a power valve assembly and a control valve for each circuit. The power valve assemblies may be linked to a common pedal or operated by a tandem master cylinder.

Preferably each circuit includes a pair of actuators of a pair of front wheel brakes on opposite sides of the vehicle and an actuator for a rear wheel brake. Each rear wheel may be provided with skid sensing means adapted to send a skid signal to the control valve of the brake circuit associated with that rear wheel. Thus in such a dual L-split system skid signals from either rear wheel can cause the braking pressure on both front wheels to be relieved.

The power valve assembly may include valve means for isolating the brakes from the high pressure source and for supplying hydrostatic fluid to the brakes in the event of a failure of the high pressure source.

Using such power valve assemblies in a dual circuit system, both circuits may be supplied from the same high pressure source.

According to another aspect of this invention the power valve assembly for a braking system of the kind set forth comprises a housing defining a stepped bore, a stepped piston working in said bore, a first inlet for connection to the high pressure source, the first valve controlling fluid flow through the first inlet, an outlet for connection to the reservoir, the second valve controlling fluid flow through the outlet, and a second inlet leading into a chamber formed between the step in the housing and the step in the piston and adapted for connection to a control valve controlling fluid under pressure, the arrangement being such that movement of the piston in the forward direction closes the second valve and opens the first valve and pressure fluid admitted to said chamber tends to move the piston in the opposite direction. Preferably the assembly includes an outlet for connection to the brakes, the first valve controlling fluid flow between the first inlet and this brake outlet.

The power valve assembly may also include a normally open third valve interposed between the first valve and the brake outlet, and a normally closed fourth valve located between the brake outlet and a pressure space behind the larger diameter portion of the stepped piston, the third valve being adapted to close and the fourth to open on failure of the pressure source.

The invention will now be further described, by way of example only, with reference to the accompanying drawings in which.

Figure 1:
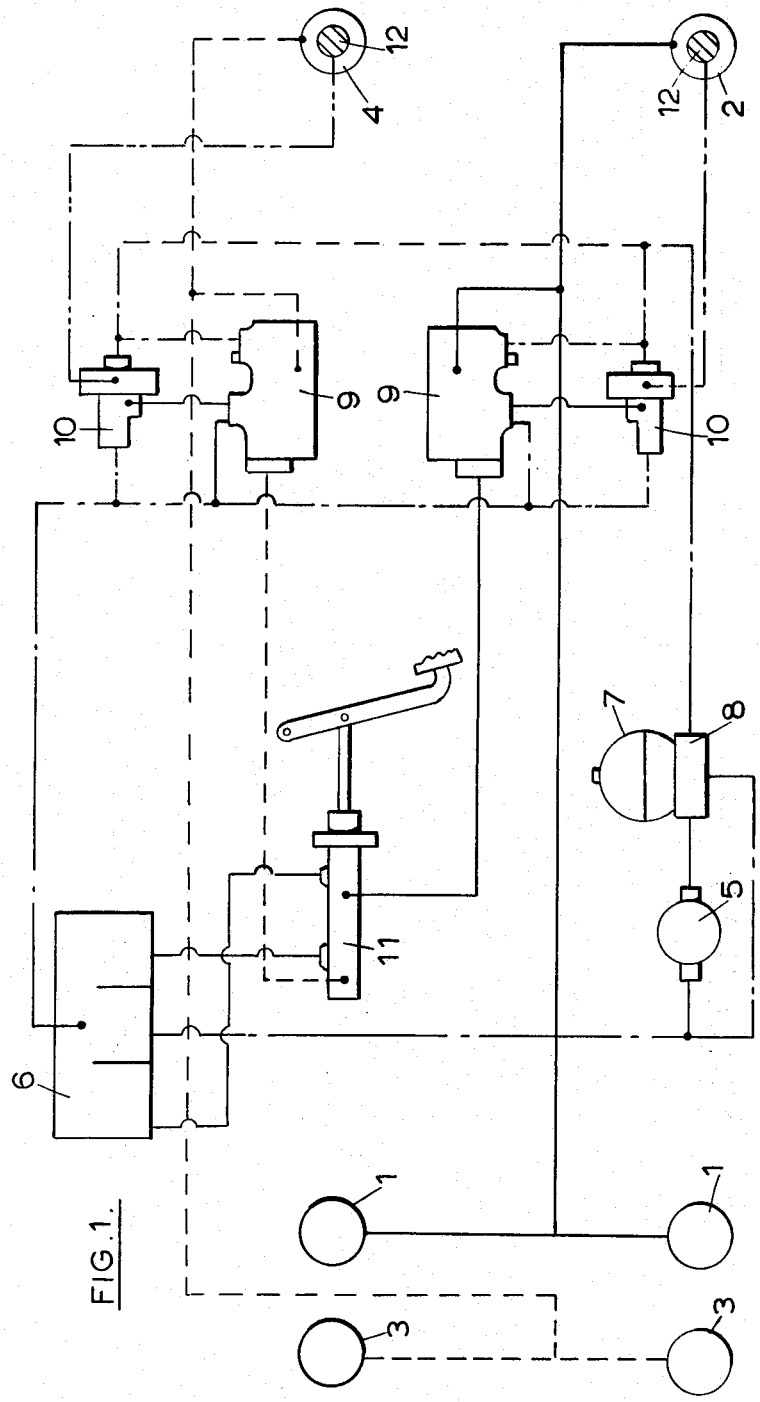
FIG. 1 shows a dual-circuit braking system in which there are two power valve assemblies controlled by respective control valves and actuated by a tandem master cylinder.

FIG. 1 shows a dual braking system in which one circuit includes a pair of front wheel brake actuators 1 and a rear wheel brake actuator 2 and the second circuit includes a second pair of front wheel brake actuators 3 and brake actuator 4 on the other rear wheel.

A pump 5 supplied from a reservoir 6 pressurises an hydraulic accumulator 7 through an unloader valve 8. The accumulator 7 is connected to a power valve assembly 9 controlling each brake circuit and also to a control valve 10 connected to each power valve assembly. The power valve assemblies 9 are each operated by pressure fluid from a separate pressure space in a pedal operated hydrostatic tandem master cylinder 11. Each control valve is operated by a signal from skid sensing means 12 associated with the rear wheel braked by the circuit in which that control valve is included.

Figure 2:
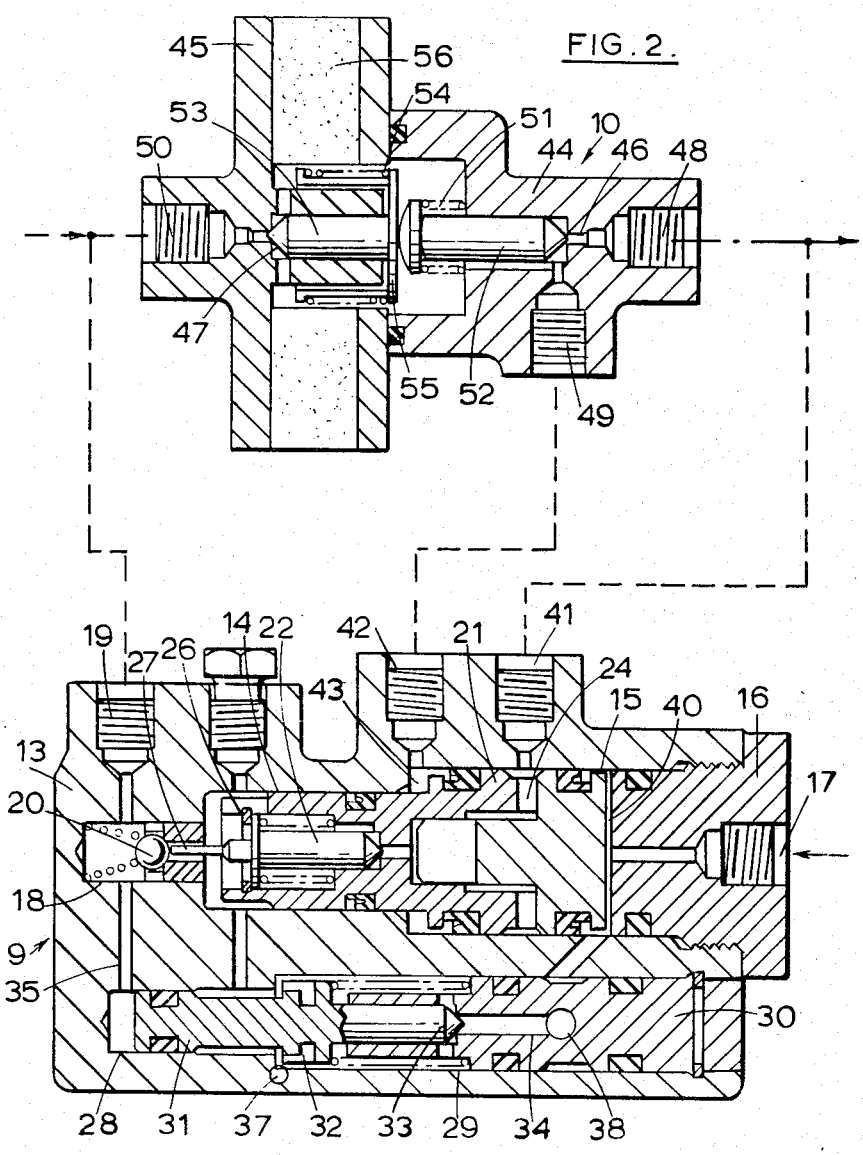
FIG. 2 is a section of a control valve and a power valve assembly of the system of FIG. 1 in which the power valve assembly incorporates a hydraulically actuated stepped piston controlling first and second valves with the stepped piston being shown in a retracted position, and a further piston controlling third and fourth valves.

The power valve assembly 9 and control valve 10 included in each circuit are shown in more detail in FIG. 2. The power valve assembly comprises a housing 13 having a stepped bore 14, 15, the open end of the larger diameter portion 15 being closed by plug 16 having a port 17 connected to the master cylinder 11, and the smaller diameter portion 14 leading into a blind recess 18. The recess 18 is connected to a first inlet port 19 which is connected to the accumulator 7, and houses a spring loaded ball valve 20 (the first valve) which controls fluid flow between the recess and the bore portion 14.

A stepped piston 21 works in the stepped bore and its end of smaller diameter is axially recessed to house a cone valve 22 (the second valve) spring-loaded away from on axial passage 23 connecting the precess in the piston to radial passages 24 in the larger diameter portion of the piston. The cone valve carries a head 25 which is loaded by the spring to engage a stop ring 26 and from which extends a push rod 27 adapted to lift ball valve 20 from its seat. For convenience the piston is formed from two parts screwed together, gaps between the two parts defining the radial passages. The piston could be machined from one piece.

A second stepped bore 28, 29 in the housing extends parallel to the first bore 14, 15, the open end of the larger diameter portion 29 being closed by a plug 30 and the small diameter portion 28 being blind. A piston 31 works in the smaller diameter plug 30 and the small bore portion and has an axial extension carrying a centre valve 32 (the third valve) which co-operates with the step in the bore and a cone valve 33 (the fourth valve) which is spring-loaded away from the end of an axial passage 34 in the plug 30. Radial passages 35, 36 connect recess 18 and bore portion 14 to opposite sides of piston 31 and a first outlet port 37 connects the bore portion 29 to the brakes. Also radial passages 38 in the plug 30 connect axial passage 34 to a passage 39 in the housing leading to the pressure space 40 between the piston and the plug 16.

A second outlet port 41 in the housing connects radial passages 24 to reservoir 6 and a second inlet port 42 connects a chamber 43 between the step in the bore 14, 15 and the step in the piston 21 to control valve 10.

In its normal state the valve assembly is as shown with the first valve 20 closed and pressure fluid from accumulator 7 in recess 18 and acting on piston 31 via passage 35 to hold centre valve 32 open and cone valve 33 closed. The second valve 22 is open connecting the brakes via port 37, passages 36, 23, 24 and port 41 to reservoir 5. When fluid from master cylinder 11 is admitted to pressure space 40 via port 17, stepped piston 21 advances to close the second valve 22 and open the first valve 20 allowing pressure fluid to pass from recess 18 to port 37 via bore portion 14, passage 36 and valve 32. When the pressure acting over the smaller diameter portion of the piston equals the pedal loading of the master cylinder the first valve closes again.

In the event of a failure in the supply of pressure fluid then the first valve 20 is held open by piston 21 but there is no fluid pressure acting on piston 31 and centre valve 32 closes isolating the brakes from the pressure supply. At the same time cone valve 33 opens and fluid from pressure space 40 is able to pass to the port 37 via passages 39, 38 and 34.

In the event of a skid electrical signals from the skid sensing means 12 operate the solenoid control valve 10 allowing pressure fluid into chamber 43 to retract the piston 21. This has the effect of opening the second valve 22 to connect port 37 to port 41 and so relieving the braking pressure to reservoir.

The solenoid valve shown in FIG. 2 comprises two body parts 44 and 45 clamped together with two axial seatings 46 and 47 substantially aligned. In body part 44 the seating 46 is located between a port 48 connected to reservoir 6 and a port 49 connected to port 42 in the power valve assembly. In body part 45 the seating 47 is located between a port 50 connected to an accumulator 7 and port 49. A spring 51 urges one cone valve 52 away from seating 46 and a second cone valve 53 towards seating 47. A solenoid coil 54 wound on a cup-shaped sleeve 55 is surrounded by a permanent magnet 56 and, when energised, moves the first valve 52 into engagement with its seating and allows the second valve to open.

Figure 3:
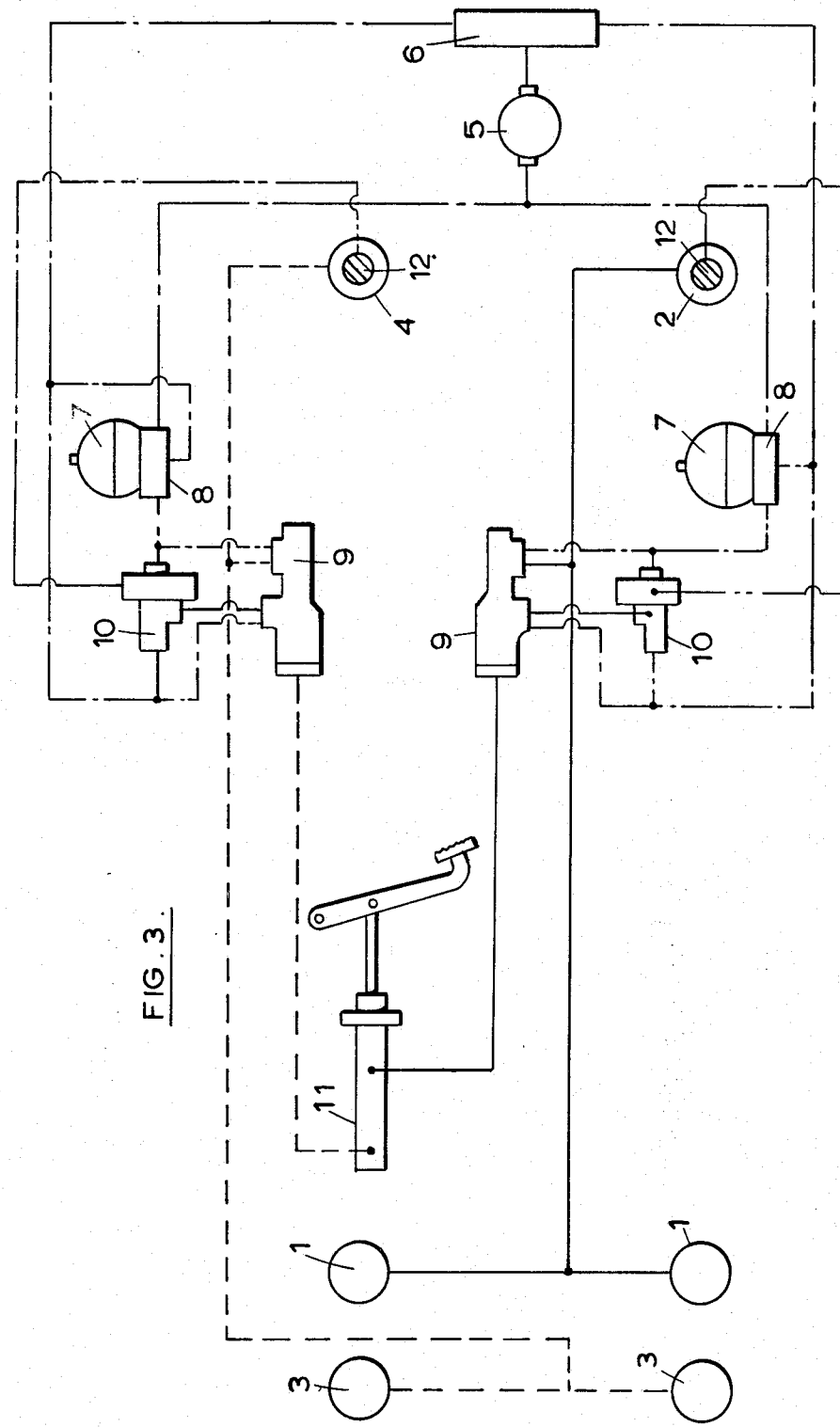
FIG. 3 shows a dual-circuit braking system similar to that of FIG. 1 but including separate accumulators for supplying the respective circuits.
Figure 4:
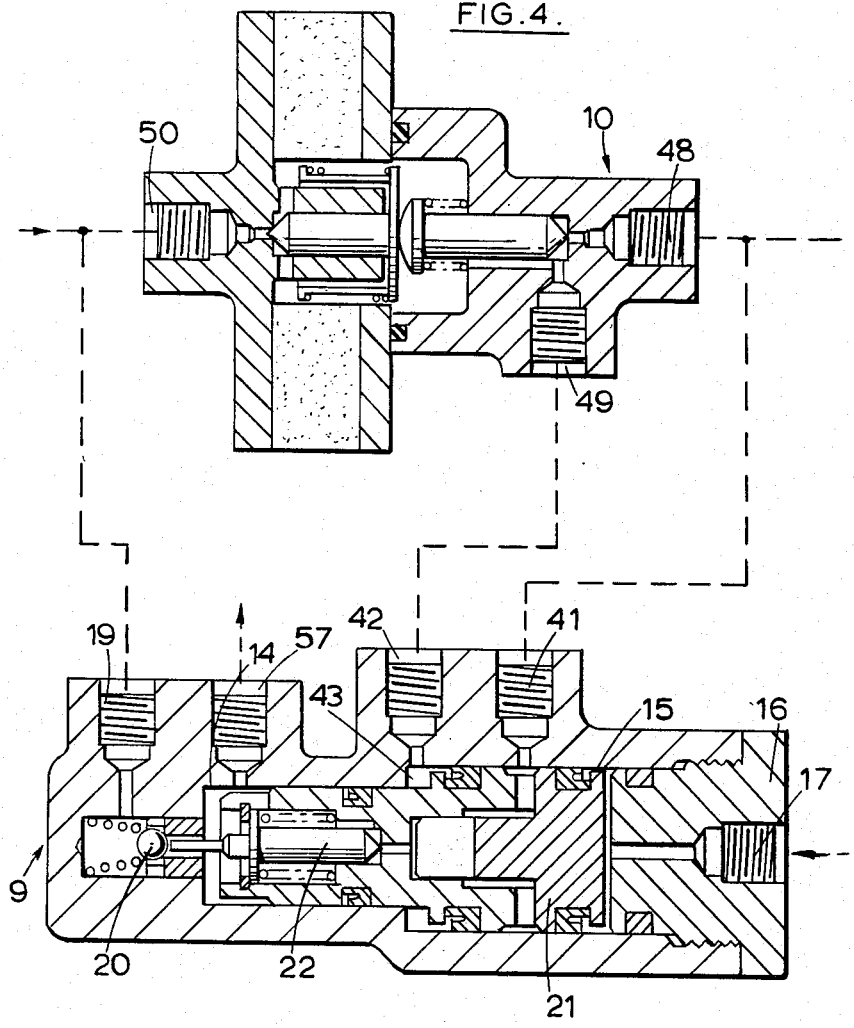
FIG. 4 is a section of one of the identical power valve assemblies used in the system of FIG. 3.

The system of FIG. 3 is the same as the system of FIG. 1 except that the pump 6 is arranged to pressurise separate accumulators 7 for each circuit. The power valve assembly 9 used in this system is shown in FIG. 4 and is the same as the assembly of FIG. 2 except that the third and fourth valves have been omitted. A port 57 in the housing connects bore portion 14 to the brakes. This port is shown plugged in FIG. 2.

Figure 5:
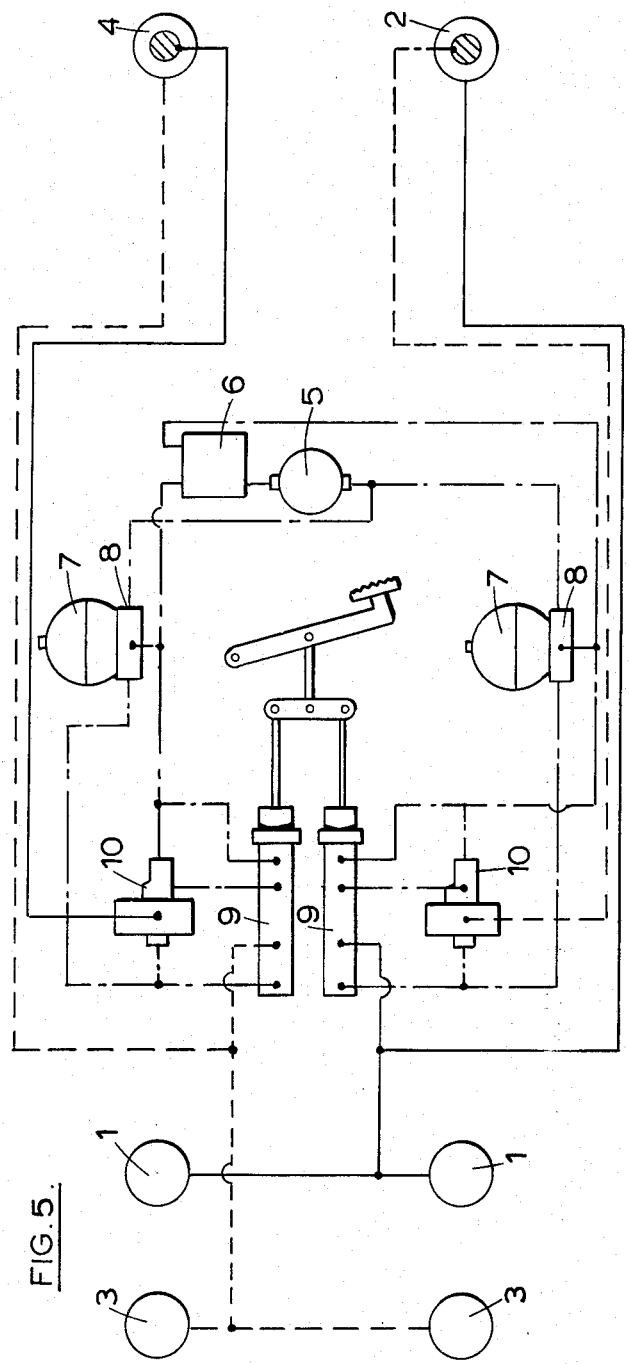
FIG. 5 shows a system similar to that of FIG. 3 but in which the pistons of the power valve assemblies are actuated mechanically by the brake pedal.
Figure 6:
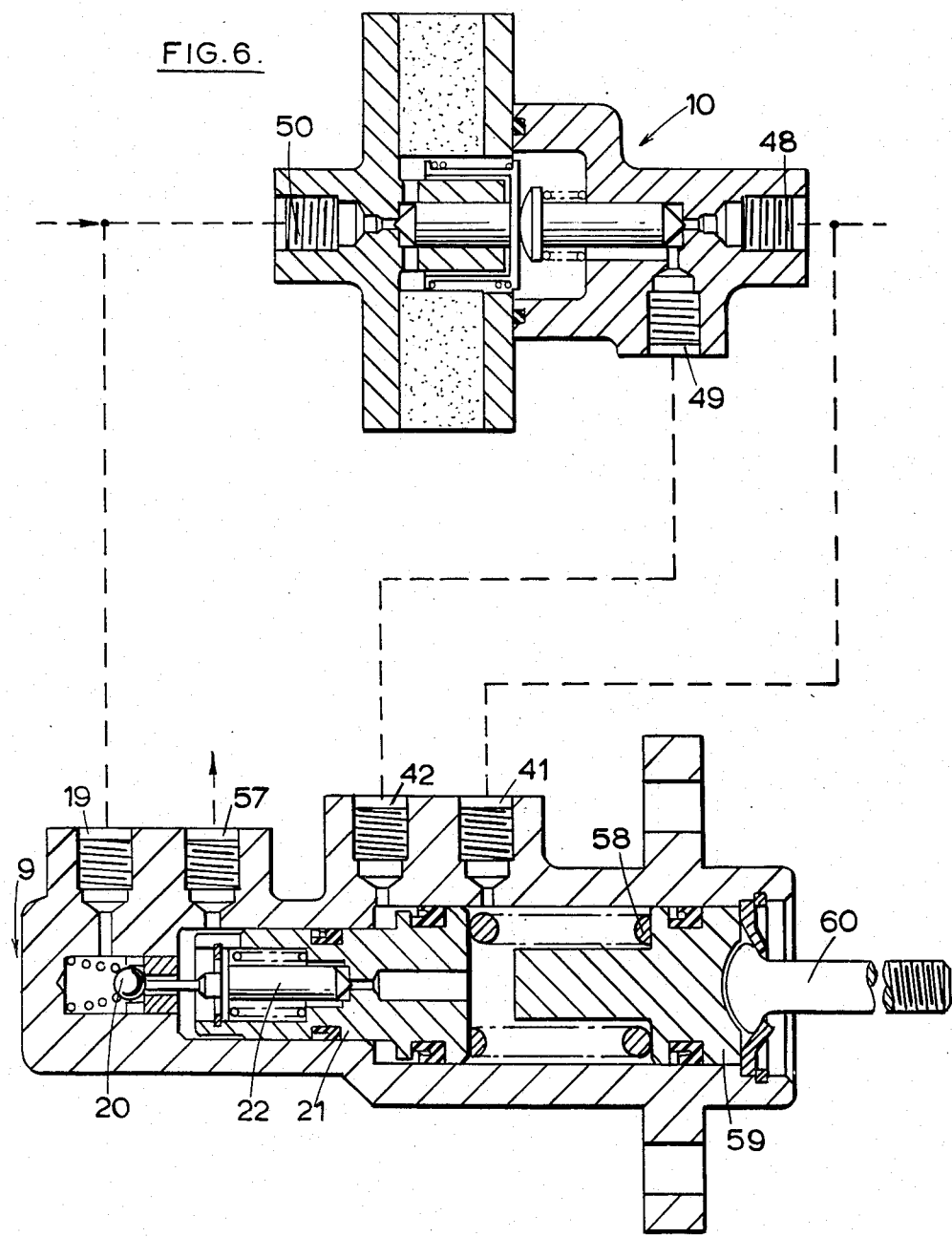
FIG. 6 is a section of a control valve and power valve assembly of the system of FIG. 5.

The system of FIG. 5 is the same as the system of FIG. 3 except that the power valve assemblies 9 are linked together and applied directly by a pedal. FIG. 6 shows how the power valve assembly 9 of FIG. 4 has been modified for pedal operation. Plug 17 is omitted and the two parts of stepped piston 21 separated by a pedal return spring 58, the rear piston part 59 being adapted to receive a push-rod 60.

I claim:

1. A vehicle hydraulic braking system of the kind incorporating a power valve assembly for applying the brakes and means for relieving the braking pressure in the event of a skid condition, wherein said power valve assembly comprises a cylinder, a piston working in said cylinder and responsive to actuation of a brake pedal, a normally-closed first valve comprising a first valve member controlling fluid communication through a first valve seat of which opposite sides respectively communicate with a connection to a first fluid pressure source and with a connection to a brake actuator, a normally-open second valve comprising a second valve member controlling fluid communication through a second valve seat of which opposite sides respectively communicate with a connection to a reservoir and with a connection to said brake actuator, said piston cooperating with said valve members so that upon axial movement of said piston in response to actuation of said brake pedal said first valve is opened and said second valve is closed, said piston and said cylinder defining between them a pressure space so arranged that on pressurisation of said pressure space said piston is retracted to close said first valve and open second valve to relieve the braking pressure, and wherein said means for relieving the braking pressure comprises a second fluid pressure source, a fluid connection between said second fluid pressure source and said pressure space of said power valve assembly, and a normally-closed valve means incorporated in said fluid connection and responsive to a skid condition to supply said pressure space with pressure fluid.

2. An hydraulic braking system as claimed in claim 1 in which said connections to said brake actuator comprise a common fluid line leading directly to a brake incorporating said actuator.

3. An hydraulic braking system as claimed in claim 1 in which said first and second fluid pressure sources comprise a single source.

4. An hydraulic braking system as claimed in claim 1 in which the normally-closed valve means in the fluid connection from said second pressure source to said pressure space comprises an electrically operated control valve actuated in response to an electrical skid signal.

5. An hydraulic braking system as claimed in claim 1 in which the cylinder and piston are stepped and said pressure space is defined between the step in the piston and the step in the bore.

6. An hydraulic braking system as claimed in claim 1 in which the piston is formed with the valve seat for one of the valves and with a passage terminating in that seat and controlled by the corresponding valve member.

7. An hydraulic braking system as claimed in claim 1 in which a second pressure space is defined between the piston and the cylinder and the arrangement is such that on actuation of the brake pedal the second pressure space is pressurised to advance the piston.

8. An hydraulic braking system as claimed in claim 7 in which the first valve seat communicates with the brake actuator through a normally open third valve of the power valve assembly, and a normally closed fourth valve of the power valve assembly is arranged to control a connection between said second pressure space and the outlet of said third valve, the third valve being adapted to close and the fourth valve to open on failure of the pressure source.

9. An hydraulic braking system as claimed in claim 4 incorporating at least two brake circuits in which each brake circuit is controlled by a respective power valve assembly, respective control valves being provided for supplying pressure fluid to retract the respective piston of each assembly.

10. An hydraulic braking system as claimed in claim 9 in which there are two brake circuits and each circuit is connected to a respective pair of actuators of a pair of front wheel brakes on opposite sides of the vehicle and to an actuator of a respective rear wheel brake, each rear wheel being provided with a skid sensing means adapted to send a skid signal to the control valve of the brake circuit associated with that rear wheel.

11. A power valve assembly for an hydraulic braking system of the kind set forth comprising a housing defining a stepped bore, a stepped piston working in said bore, a first inlet connection for connection to a fluid pressure source, a first valve controlling fluid flow through the first inlet, an outlet for connection to a reservoir, a second valve controlling fluid flow through the outlet, and a second inlet leading into a chamber formed between the step in the housing and the step in the piston and adapted for connection to a control valve controlling fluid under pressure, the arrangement being such that movement of the piston in the forward direction closes the second valve and opens the first valve and pressure fluid admitted to said chamber tends to move the piston in the opposite direction.

12. A power valve assembly as claimed in claim 11 incorporating a normally open third valve controlling the outlet from said first valve, and a normally closed fourth valve connected between the outlet of said third valve and a pressure space behind the larger diameter portion of the stepped piston, the third valve being adapted to close and the fourth valve to open on failure of the pressure source.

* * * * *